United States Patent
Azmandian

(10) Patent No.: US 12,186,656 B2
(45) Date of Patent: Jan. 7, 2025

(54) SYSTEMS AND METHODS FOR MANAGING VIRTUAL WORLD IN CLOUD-BASED GAMING

(71) Applicant: Sony Interactive Entertainment Inc., Tokyo (JP)

(72) Inventor: Mahdi Azmandian, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 176 days.

(21) Appl. No.: 17/957,323

(22) Filed: Sep. 30, 2022

(65) Prior Publication Data

US 2024/0108979 A1    Apr. 4, 2024

(51) Int. Cl.
*A63F 13/355* (2014.01)
*A63F 13/57* (2014.01)
*G06T 15/50* (2011.01)

(52) U.S. Cl.
CPC .......... *A63F 13/355* (2014.09); *A63F 13/57* (2014.09); *G06T 15/503* (2013.01)

(58) Field of Classification Search
CPC .... A63F 13/355; A63F 13/358; A63F 13/352; A63F 13/35; A63F 13/57; A63F 13/573; A63F 13/577; A63F 13/58; G06T 15/503
See application file for complete search history.

(56) References Cited

U.S. PATENT DOCUMENTS

| | | | | |
|---|---|---|---|---|
| 9,409,083 B2 * | 8/2016 | George | ................... | A63F 13/00 |
| 9,814,968 B1 * | 11/2017 | Kim | ................... | A63F 13/5252 |
| 10,086,288 B1 * | 10/2018 | Surjo-Subagio | ...... | H04L 67/141 |
| 10,179,290 B2 * | 1/2019 | Benedetto | ............... | A63F 13/47 |
| 11,161,045 B1 * | 11/2021 | Surjo-Subagio | ........ | A63F 13/35 |
| 11,278,810 B1 * | 3/2022 | Sarria, Jr. | ............. | G06F 3/0482 |
| 2002/0094863 A1 * | 7/2002 | Klayh | ..................... | A63F 13/71 463/21 |
| 2004/0005926 A1 * | 1/2004 | LeFroy | ................... | G07F 17/32 463/42 |

(Continued)

OTHER PUBLICATIONS

PCT Application No. PCT/US2023/033162, International Search Report and Written Opinion, Mailed Jan. 4, 2024, 11 pages.

*Primary Examiner* — David L Lewis
*Assistant Examiner* — Matthew D Hoel
(74) *Attorney, Agent, or Firm* — Penilla IP, APC

(57) ABSTRACT

A cloud-based gaming system generates first and second instances of a virtual world of an online game for first and second players, respectively. First and second video streams of the first and second instances of the virtual world, respectively, are transmitted to the first and second players, respectively. The second video stream includes a ghosted version of a feature within the first instance of the virtual world. A request is received from the second player to merge the first and second instances of the virtual world. With the first player's approval, a merged instance of the virtual world is automatically generated by the cloud-gaming system as a combination of the first and second instances of the virtual world. Third and fourth video streams of the merged instance of the virtual world are transmitted to the first and second players, respectively, in lieu of the first and second video streams, respectively.

20 Claims, 8 Drawing Sheets

(56) References Cited

U.S. PATENT DOCUMENTS

| | | | | |
|---|---|---|---|---|
| 2007/0111794 A1* | 5/2007 | Hogan | .................. | A63F 13/335 |
| | | | | 463/42 |
| 2009/0325136 A1* | 12/2009 | Delbue | .................. | A63F 13/25 |
| | | | | 434/322 |
| 2012/0172133 A1* | 7/2012 | Trexler | ............... | G07F 17/3234 |
| | | | | 463/42 |
| 2013/0296045 A1* | 11/2013 | Dun | ........................ | A63F 13/35 |
| | | | | 463/31 |
| 2016/0082348 A1* | 3/2016 | Kehoe | .................. | G06Q 10/101 |
| | | | | 463/31 |
| 2016/0121212 A1* | 5/2016 | Dun | ..................... | A63F 13/358 |
| | | | | 463/31 |
| 2017/0189812 A1* | 7/2017 | Ozer | ...................... | A63F 13/48 |
| 2018/0021684 A1* | 1/2018 | Benedetto | ............. | A63F 13/493 |
| | | | | 463/24 |
| 2018/0065039 A1* | 3/2018 | Kim | ..................... | A63F 13/537 |
| 2018/0214775 A1* | 8/2018 | Karashima | ............. | A63F 13/63 |
| 2019/0105573 A1* | 4/2019 | Benedetto | ............. | A63F 13/355 |
| 2020/0197821 A1* | 6/2020 | Benedetto | ............. | A63F 13/493 |
| 2020/0246698 A1* | 8/2020 | Oshino | .................... | A63F 13/35 |
| 2022/0314120 A1* | 10/2022 | Sarria, Jr. | ................ | G06F 3/016 |
| 2024/0108979 A1* | 4/2024 | Azmandian | ............ | A63F 13/355 |

\* cited by examiner

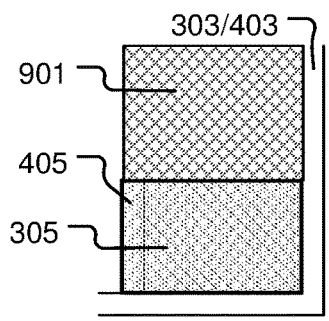
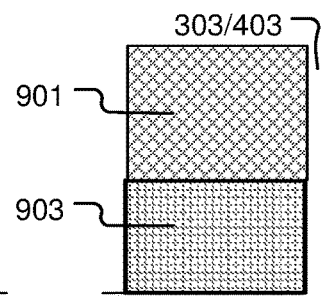
Fig. 9A          Fig. 9B
| Object ID | Description | Extant Pre-Merge | | Created In-Merge | | Retain Post-Merge | |
|---|---|---|---|---|---|---|---|
| | | P1 | P2 | P1 | P2 | P1 | P2 |
| 001 | Coffee Shop | yes | no | no | no | yes | no |
| 002 | Maple Tree | yes | no | no | no | yes | no |
| 003 | Sidewalk | yes | yes | no | no | yes | yes |
| 004 | Museum of Art | no | yes | no | no | no | yes |
| 005 | Lightpost | no | yes | no | no | no | yes |
| 006 | Theater | no | no | yes | yes | yes | yes |
| 007 | Pet Dog | no | no | yes | no | yes | no |
| 008 | Garden | no | no | no | yes | no | yes |
| ⋮ | ⋮ | ⋮ | ⋮ | ⋮ | ⋮ | ⋮ | ⋮ |
Fig. 10

SYSTEMS AND METHODS FOR MANAGING VIRTUAL WORLD IN CLOUD-BASED GAMING

BACKGROUND

The video game industry has seen many changes over the years and has been trying to find ways to enhance the video game play experience for players and increase player engagement with the video games and/or online gaming systems. When a player increases their engagement with a video game, the player is more likely to continue playing the video game and/or play the video game more frequently, which ultimately leads to increased revenue for the video game developers and providers and video game industry in general. Therefore, video game developers and providers continue to seek improvements in video game operations to provide for increased player engagement and enhanced player experience. It is within this context that implementations of the present disclosure arise.

SUMMARY

In an example embodiment, a method is disclosed for managing a virtual world in cloud gaming. The method includes generating a first instance of a virtual world for a first player. The method also includes transmitting a first video stream of a portion of the first instance of the virtual world to a computing system of the first player. The method also includes generating a second instance of the virtual world for a second player. The method also includes transmitting a second video stream of a portion of the second instance of the virtual world to a computing system of the second player. The second video stream includes a ghosted version of at least one feature of the first instance of the virtual world. The method also includes receiving a request from the second player to merge the first and second instances of the virtual world. The method also includes receiving an approval from the first player to merge the first and second instances of the virtual world. The method also includes generating a merged instance of the virtual world that is a combination of the first and second instances of the virtual world. The method also includes transmitting a third video stream of a portion of the merged instance of the virtual world to the computing system of the first player in lieu of the first video stream. The method also includes transmitting a fourth video stream of a portion of the merged instance of the virtual world to the computing system of the second player in lieu of the second video stream.

In an example embodiment, a cloud-based gaming system is disclosed. The cloud-based gaming system includes a server computing system programmed to generate a first instance of a virtual world for a first player. The server computing system is programmed to transmit a first video stream of a portion of the first instance of the virtual world to a computing system of the first player. The server computing system is programmed to generate a second instance of the virtual world for a second player. The server computing system is programmed to transmit a second video stream of a portion of the second instance of the virtual world to a computing system of the second player. The second video stream includes a ghosted version of at least one feature of the first instance of the virtual world. The server computing system is programmed to receive a request from the second player to merge the first and second instances of the virtual world. The server computing system is programmed to receive an approval from the first player to merge the first and second instances of the virtual world. The server computing system is programmed to automatically generate a merged instance of the virtual world that is a combination of the first and second instances of the virtual world. The server computing system is programmed to transmit a third video stream of a portion of the merged instance of the virtual world to the computing system of the first player in lieu of the first video stream. The server computing system is programmed to transmit a fourth video stream of a portion of the merged instance of the virtual world to the computing system of the second player in lieu of the second video stream.

BRIEF DESCRIPTION OF THE DRAWINGS

FIG. 9A shows an example overhead layout view of the portion of the virtual world near the corner of $1^{st}$ St. and Main St. from the examples of FIGS. 3 and 4 in which a substantial positional interference exists between in-game objects in the first instance of the virtual world of the first player and the second instance of the virtual world of the second player, in accordance with some embodiments.

FIG. 9B shows the new blended in-game object is a combination of the coffee shop from the first instance of the virtual world of the first player and the Museum of Fine Art from the second instance of the virtual world of the second player, where the new blended in-game object has features selected from each of the coffee shop and the Museum of Fine Art, in accordance with some embodiments.

FIG. 10 shows an example table for tracking various in-game objects within the merged instance of the virtual world, in accordance with some embodiments.

DETAILED DESCRIPTION

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Figure 1:
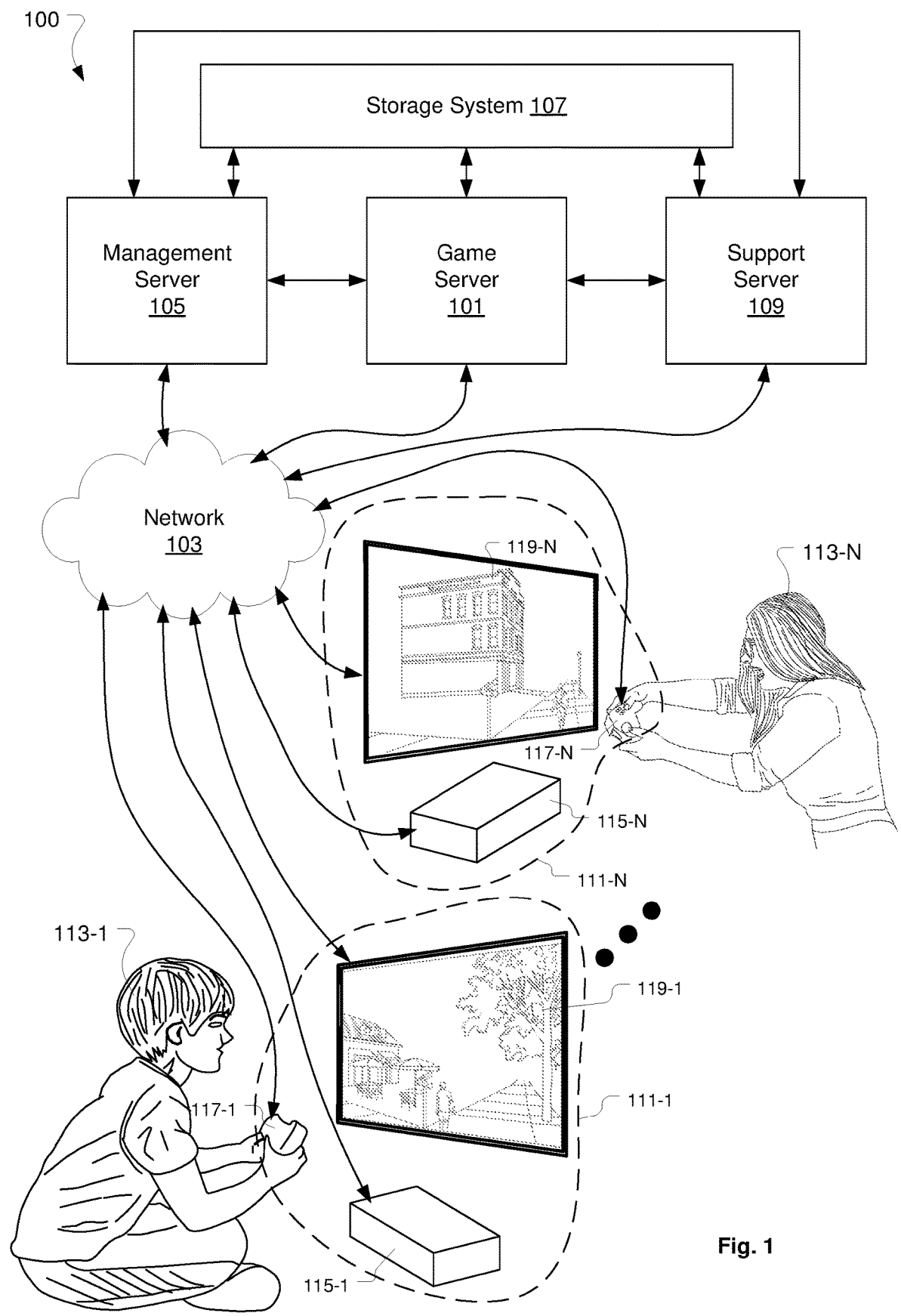
FIG. 1 shows an overview of an cloud-based gaming system for serving cloud-based multiplayer video games, in accordance with some embodiments.

A cloud-based multiplayer video game can include multiple players interacting within a common game context. In some embodiments, the common game context is a virtual world in which the game players can move around and interact with each other and with various in-game objects in three-dimensional space. The cloud-based multiplayer video game is executed on one or more server computing systems that function to generate and stream video game content to each player, where the video game content for a given player is unique to the given player's situation and point of view within the common game context. FIG. 1 shows an overview of an cloud-based gaming system 100 for serving cloud-based multiplayer video games, in accordance with some embodiments. The cloud-based gaming system 100 includes one or more game server(s) 101 connected for bi-directional data communication with a network 103, such as the Internet. In some embodiments, the game server 101 is a computing device configured to execute the cloud-based multiplayer video game, or some portion of the cloud-based multiplayer video game. In some embodiments, one or more management server(s) 105 is/are connected for bi-directional data communication with the game server 101 and for bi-directional data communication with the network 103. The management server 105 can be configured to handle overhead tasks associated with the cloud-based gaming system 100, such as handling of game selection requests and placement of players in various game sessions or game rooms, by way of example. In various embodiments, the management server 105 is configured to handle essentially any task needed to support operation of the cloud-based gaming system 100 and game play. The cloud-based gaming system 100 also includes one or more storage system(s) 107 connected for bi-directional data communication with the game server 101 and for bi-directional data communication with the management server 105. The storage system 107 functions to store data associated with games served by the cloud-based gaming system 100 and data associated with players that engage with the cloud-based gaming system 100. In various embodiments, the cloud-based gaming system 100 includes one or more additional support server(s) 109 in bi-directional data communication with one or more of the game server 101, the management server 105, and the storage server 107. In various embodiments, the support server 109 is configured to assist with essentially any computing task associated with operation of the cloud-based gaming system 100.

The cloud-based gaming system 100 is configured to simultaneously receive data communication from and send data communication to computing devices 111-1 through 111-N local to and respectively operated by a number (N) of multiple players 113-1 through 113-N. In some embodiments, the game server 101 is used to perform operations of a durational information platform for video game players. Cloud-based video games played over the Internet operate through a connection to the game server 101. Typically, cloud-based games use a dedicated server application that collects data from and distributes data to the players 113-1 through 113-N. The computing devices 111-1 through 111-N are respectively connected to the network 103 to enable data communication to and from the cloud-based gaming system 100. In various embodiments, the data communication between the computing devices 111-1 through 111-N and the network is implemented through any known data communication means, such as transmission of signals through wires or through the air by wireless means, such as through WIFI, BLUETOOTH, cellular, radio, optical, satellite, and/or other wireless communication systems. In various embodiments, the computing devices 111-1 through 111-N include game system consoles 115-1 through 115-N and/or control devices 117-1 through 117-N and/or television/display systems 119-1 through 119-N. In various embodiments, the control devices 117-1 through 117-N include one or more of a game controller, a keyboard, a head-mounted display (HMD) device, and a game input device (such as a wand, pointer, bat, club, racket, paddle, gun, steering device, pedal device, or any other form of game input/control device), or other type of control device. In some embodiments, the television/display systems 119-1 through 119-N are connected to one or more ancillary computing/communication devices, such as a dongle, to enable data communication between any two or more of the television/display systems 119-1 through 119-N, the control devices 117-1 through 117-N, the game system consoles 115-1 through 115-N, and the network 103.

Many cloud-based multiplayer video games provide for interaction between multiple players 113-1 through 113-N, which can include opposing game play, individual game play, and/or team game play. Also, many cloud-based multiplayer video games provide for communication between players 113-1 through 113-N, where the players can be either opposing each other, or on the same team, or acting as an independent player within a given game context, e.g., within a given virtual world. Such player-to-player communication can be done by chat/text communication, voice communication, or other types of data/content communication, e.g., picture, video, emoticon, etc., depending on what the game allows and/or what the cloud-based gaming system 100 allows. Interactivity and communication between players 113-1 through 113-N in cloud-based multiplayer video games can significantly improve the richness of the game experience.

In some embodiments, a cloud-based multiplayer video game provides a virtual world in which multiple game players engage in various in-game actions, such as moving through the virtual world in a three-dimensional manner, interacting with objects within the virtual world, engaging in player-to-player, e.g., avatar-to-avatar, interaction within the virtual world, creating objects within the virtual world, modifying objects within the virtual world, destroying objects within the virtual world, moving objects within the virtual world, removing objects from the virtual world, acquiring and/or selling in-game assets within the virtual world, among essentially any other action that may be performed by a game player having a presence, e.g., avatar existence, within the virtual world. In some cloud-based multiplayer video games, two or more players engage in game play within the same virtual world, but in respective versions of the same virtual world. In other words, each of the multiple players has their own instance of the same virtual world. Various embodiments are disclosed herein for promoting interactivity and communication between multiple players to improve the richness of the game experience by enabling multiple players within a given virtual world to experience and engage with other player's respective instances of the given virtual world.

Figure 2:
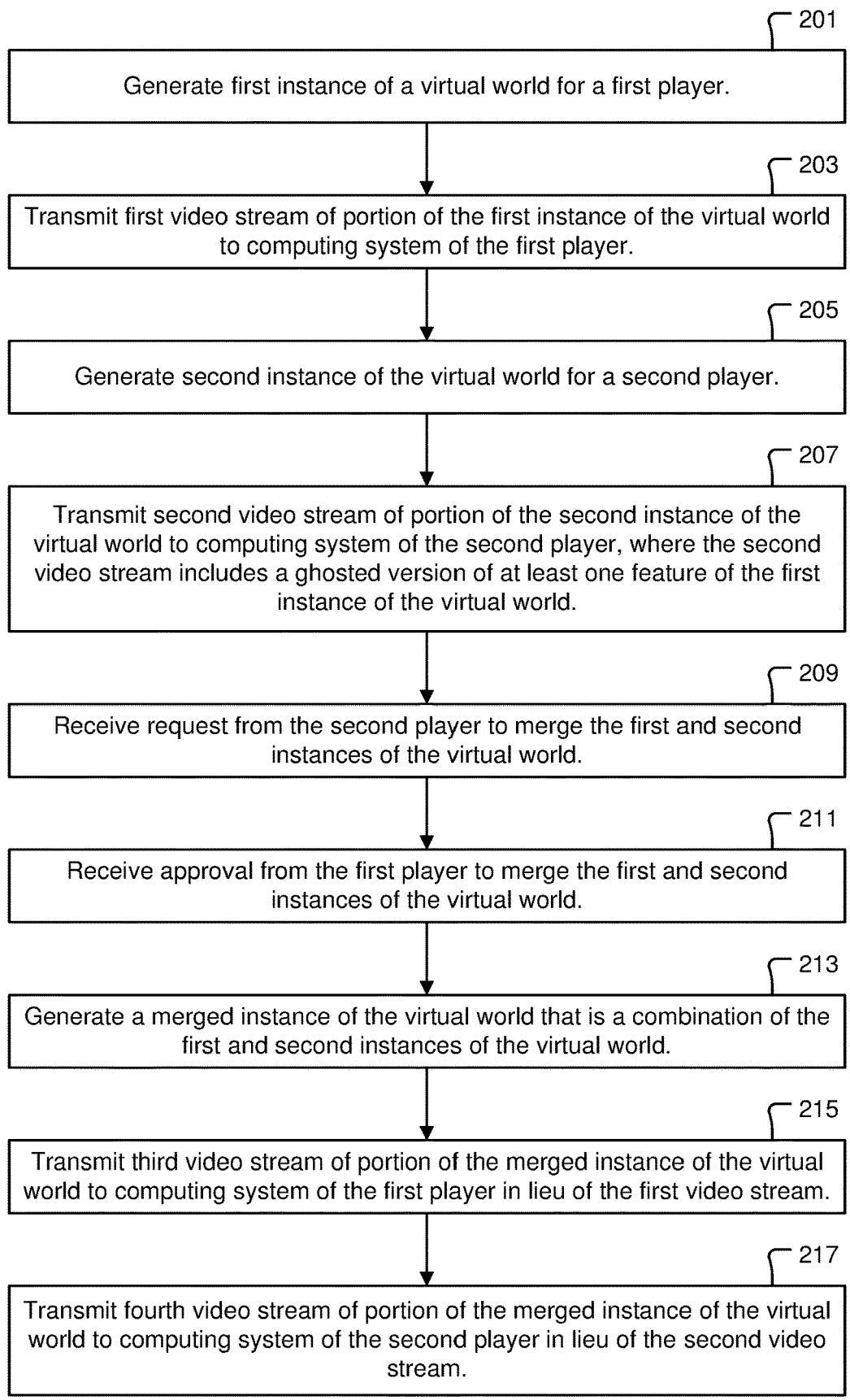
FIG. 2 shows a flowchart of a method for managing a virtual world in cloud-based online gaming, in accordance with some embodiments.

FIG. 2 shows a flowchart of a method for managing a virtual world in cloud-based online gaming, in accordance with some embodiments. It should be understood that in various embodiments the method of FIG. 2 is executed by one or more of the game server 101, the management server 105, and the support server 109. The method includes an operation 201 for generating a first instance of a virtual world for a first player. For example, in some embodiments, the first player logs into the cloud-based gaming system 100 and selects to play a game that includes the virtual world. In response to this request, the cloud-based gaming system 100 loads the game state for the first player, whether it be a new/fresh game state or a previously saved game state. Then, by way of execution of the game on the game server 101, the cloud-based gaming system 100 generates the first instance of the virtual world for the first player. In this sense, the "first instance" of the virtual world for the first player is used as a clarifying term to distinguish from any other instance of the same virtual world that may be generated for another player other than the first player.

The method proceeds with an operation 203 for transmitting a first video stream of a portion of the first instance of the virtual world to a computing system of the first player. It should be understood that the first player's virtual experience within the first instance of the virtual world is conveyed to the first player through video and audio. Transmission of the first video stream includes encoding of the video frames of the virtual world generated by the game server 101 in response to play of the game by the first player, conveyance of the encoded video frames over the network 103 from the cloud-based gaming system 100 to the computing system of the first player, and decoding of the encoded video frames at the computing system of the first player. The decoded video frames of the first video stream are displayed on the display device of the computing system of the first player. The audio stream that accompanies the first video stream is similarly transmitted from the over the network 103 from the cloud-based gaming system 100 to the computing system of the first player. The audio of the audio stream is played on speakers connected to the computing system of the first player in conjunction with display of the decoded video frames of the first video stream on the display device of the computing system of the first player.

Figure 3:
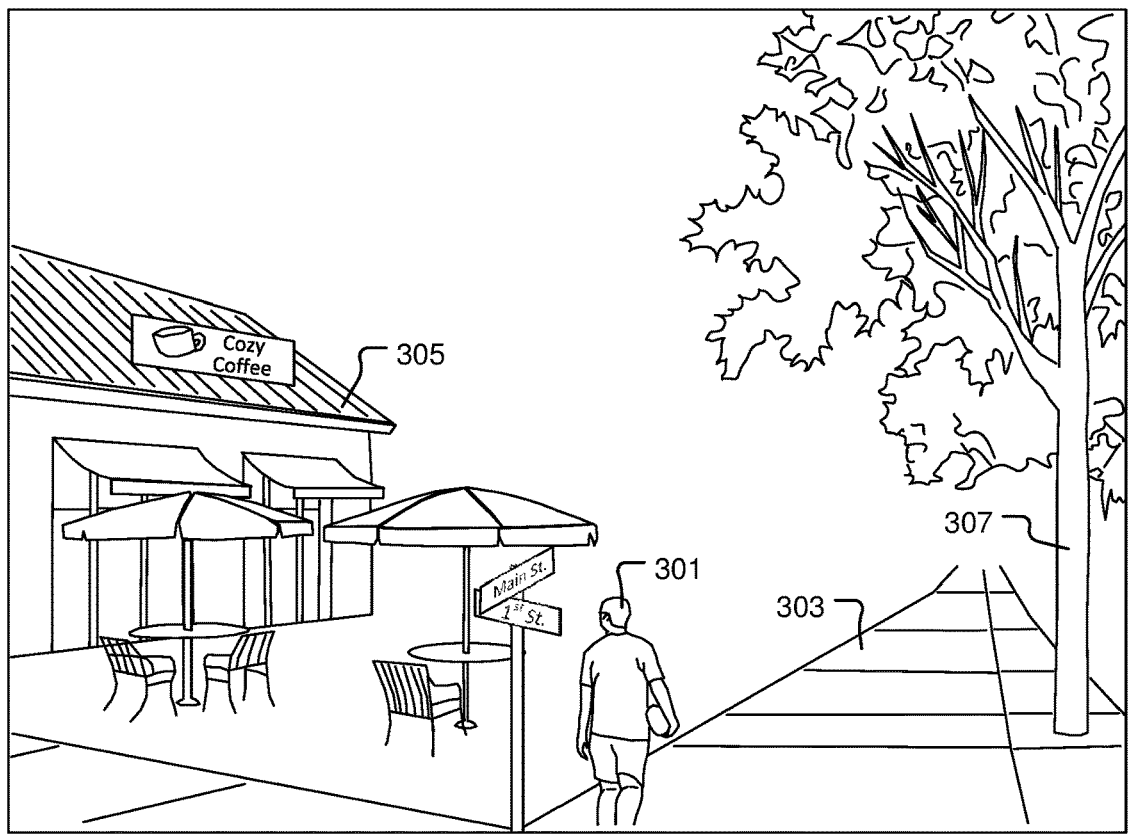
FIG. 3 shows an example image from the first video stream of the portion of the first instance of the virtual world as transmitted to the computing system of the first player, in accordance with some embodiments.

FIG. 3 shows an example image from the first video stream of the portion of the first instance of the virtual world as transmitted to the computing system of the first player, in accordance with some embodiments. It should be understood that the example image of FIG. 3 is provided by way of example to facilitate description and does not represent any limitation on what may or may not be displayed within the first video stream of the portion of the first instance of the virtual world. In the example image of FIG. 3, an avatar 301 of the first player is shown walking down a sidewalk 303 at the corner of $1^{st}$ St. and Main St. In this example, the region within the virtual world near the corner of $1^{st}$ St. and Main St. is the portion of the first instance of the virtual world that is currently shown in the first video stream. The portion of the first instance of the virtual world includes a coffee shop 305 at the corner of $1^{st}$ St. and Main St. and a large maple tree 307 growing through the sidewalk 303.

The method of FIG. 2 also includes an operation 205 for generating a second instance of the virtual world for a second player. For example, in some embodiments, the second player logs into the cloud-based gaming system 100 and selects to play the game that includes the virtual world. In response to this request, the cloud-based gaming system 100 loads the game state for the second player, whether it be a new/fresh game state or a previously saved game state. Then, by way of execution of the game on the game server 101, the cloud-based gaming system 100 generates the second instance of the virtual world for the second player. In this sense, the "second instance" of the virtual world for the second player is used as a clarifying term to distinguish from any other instance of the same virtual world that may be generated for another player other than the second player. More specifically, the virtual world in which the first player and the second player are playing is the same virtual world. However, each of the first player and the second player are playing in their own respective instances of the same virtual world, i.e., the first player is playing in the first instance of the virtual world, and the second player is playing in the second instance of the virtual world.

The method proceeds with an operation 207 for transmitting a second video stream of a portion of the second instance of the virtual world to a computing system of the second player. The term "second video stream" is used to distinguish from the "first video stream" that is transmitted to the first player. It should be understood that the second player's virtual experience within the second instance of the virtual world is conveyed to the second player through video and audio. Transmission of the second video stream includes encoding of the video frames of the virtual world generated by the game server 101 in response to play of the game by the second player, conveyance of the encoded video frames over the network 103 from the cloud-based gaming system 100 to the computing system of the second player, and decoding of the encoded video frames at the computing system of the second player. The decoded video frames of the second video stream are displayed on the display device of the computing system of the second player. The audio stream that accompanies the second video stream is similarly transmitted over the network 103 from the cloud-based gaming system 100 to the computing system of the second player. The audio of the audio stream is played on speakers connected to the computing system of the second player in conjunction with display of the decoded video frames of the second video stream on the display device of the computing system of the second player.

Figure 4:
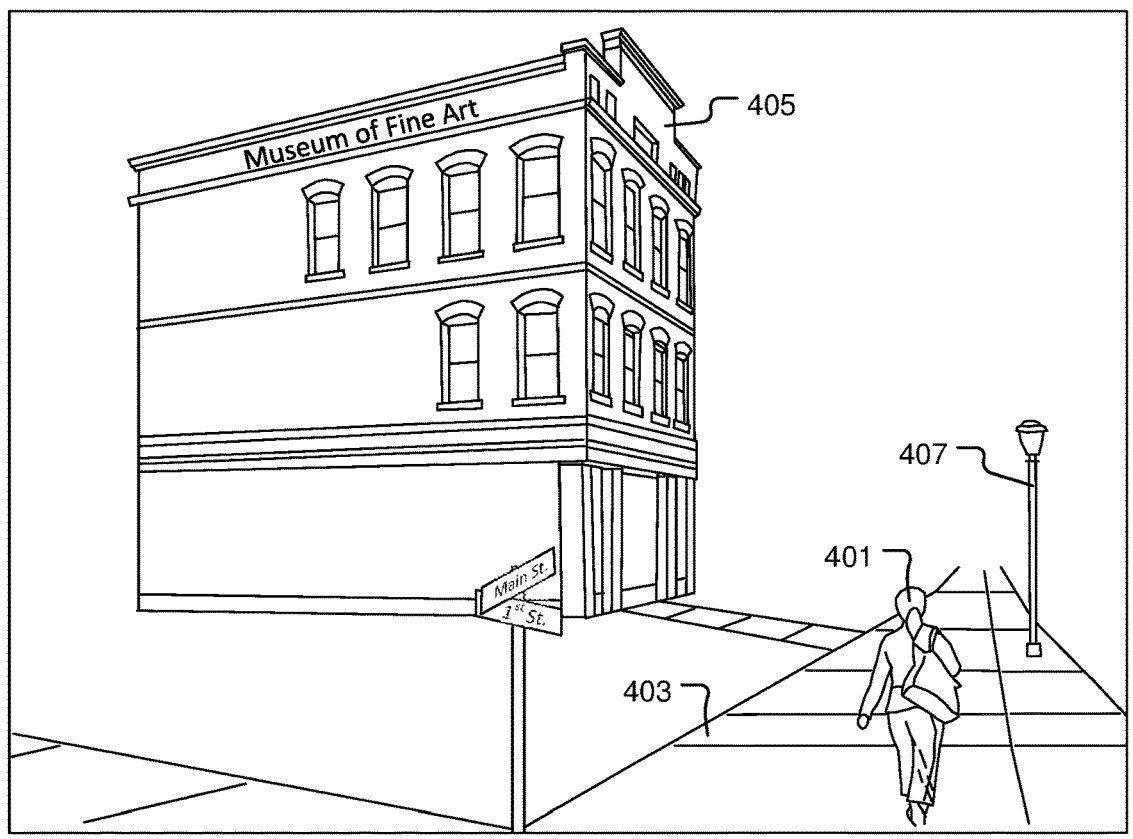
FIG. 4 shows an example image of the portion of the second instance of the virtual world as transmitted to the computing system of the second player, in accordance with some embodiments.

FIG. 4 shows an example image of the portion of the second instance of the virtual world as transmitted to the computing system of the second player, in accordance with some embodiments. It should be understood that the example image of FIG. 4 is provided by way of example to facilitate description and does not represent any limitation on what may or may not be displayed within the second video stream of the portion of the second instance of the virtual world. In the example image of FIG. 4, an avatar 401 of the second player is shown walking down a sidewalk 403 at the corner of 1$^{st}$ St. and Main St. In this example, the region within the virtual world near the corner of 1$^{st}$ St. and Main St. is the portion of the second instance of the virtual world that is currently shown in the second video stream. The portion of the second instance of the virtual world includes a Museum of Fine Art 405 on Main St. near the corner of 1$^{st}$ St. and Main St. The portion of the second instance of the virtual world also includes a streetlamp 407 on the sidewalk 403 just outside the entrance of the Museum of Fine Art 405.

The portion of the first instance of the virtual world of the first player and the portion of the second instance of the virtual world of the second player correspond to a same region within the virtual world. For example, it should be understood that the corner of 1$^{st}$ St. and Main St. is the same location in the first instance of the virtual world for the first player and the second instance of the virtual world for the second player. However, because the first instance of the virtual world for the first player is defined independently by the first player (based on game play of the first player), and because the second instance of the virtual world for the second player is defined independently by the second player (based on game play of the second player), it is possible, as shown by FIGS. 3 and 4, that the in-game objects and attributes at the corner of 1$^{st}$ St. and Main St. within the virtual world are different within the first and second instances of the virtual world for the first and second players, respectively.

In the method of FIG. 2, the second video stream that is transmitted to the computing system of the second player in operation 207 also includes a ghosted version of at least one feature of the first instance of the virtual world that is transmitted to the computing system of the first player in operation 203. The ghosted version of at least one feature of the first instance of the virtual world (associated with gameplay by the first player) is included in the second video stream in conjunction with the portion of the second instance of the virtual world for the second player. The term "ghosted version" means that the visual depiction of the at least one feature of the first instance of the virtual world is shown in the second video stream in a manner that makes it clear that the at least one feature of the first instance of the virtual world is not part of the portion of the second instance of the virtual world that is generated for the second player based on gameplay by the second player. In some embodiments, the ghosted version of the at least one feature of the first instance of the virtual world is visually distinguished by one or more of opaqueness, color, contrast, drawing type (e.g., line drawing versus solid drawing), line type (e.g., dashed lines), among essentially any other uniquely distinguishing visual depiction technique. In some embodiments, the ghosted version of at least one feature of the first instance of the virtual world is dynamically displayed within the second video stream, such that real-time movements and/or changes of the at least one feature of the first instance of the virtual world are displayed within the second video stream. Alternatively, in some embodiments, the ghosted version of at least one feature of the first instance of the virtual world is statically displayed within the second video stream, such that a snapshot of the at least one feature of the first instance of the virtual world is displayed within the second video stream. In some embodiments, the ghosted version of at least one feature of the first instance of the virtual world as shown in the second video stream includes a ghosted version of an avatar of the first player. In some embodiments, the ghosted version of at least one feature of the first instance of the virtual world as shown in the second video stream includes a ghosted version of an in-game object within the first instance of the virtual world.

Figure 5:
FIG. 5 shows an example image from the second video stream of the portion of the second instance of the virtual world as transmitted to the computing system of the second player with the ghosted version of at least one feature of the first instance of the virtual world included in the second video stream, in accordance with some embodiments.

FIG. 5 shows an example image from the second video stream of the portion of the second instance of the virtual world as transmitted to the computing system of the second player with the ghosted version of at least one feature of the first instance of the virtual world included in the second video stream, in accordance with some embodiments. Specifically, the example image of FIG. 5 shows both the portion of the second instance of the virtual world as would normally be transmitted to the computing system of the second player (as shown in FIG. 4), and a ghosted version of the portion of the first instance of the virtual world as would normally be transmitted to the computing system of the first player (as shown in FIG. 3). In the example of FIG. 5, the ghosted version of the portion of the first instance of the virtual world is visually distinguished using dashed/dotted lines.

The method of FIG. 2 continues with an operation 209 for receiving a request from the second player to merge the first instance of the virtual world of the first player with the second instance of the virtual world of the second player. In some embodiments, the request received in the operation 209 is received as an input provided by the second player in response to a prompt provided by the cloud-based gaming system 100 through the second video stream. In some embodiments, the request received in the operation 209 from the second player to merge the first and second instances of the virtual world is initiated by activation of a user-activatable control displayed in the second video stream. In some embodiments, the user-activatable control is displayed in conjunction with display of the ghosted version of at least one feature of the first instance of the virtual world of the first player. In some embodiments, the user-activatable control is activated by one or more of a controller input, a voice command, and a video-captured player gesture. For example, FIG. 5 shows a prompt 501 that invites the second player to press a control button on their game controller in order to send a virtual world merge invitation to the first player. Upon receiving the input from the second player to send the virtual world merge invitation to the first player, the cloud-gaming system 100 notifies the first player of the virtual world merge invitation and requests a response from the first player through the first video stream.

Figure 6:
FIG. 6 shows an example image from the first video stream of the portion of the first instance of the virtual world as transmitted to the computing system of the first player to convey the virtual world merge invitation, in accordance with some embodiments.

FIG. 6 shows an example image from the first video stream of the portion of the first instance of the virtual world as transmitted to the computing system of the first player to convey the virtual world merge invitation, in accordance with some embodiments. In the example of FIG. 6, ghosted versions of the features of the second instance of the virtual world are presented to the first player in the first video stream, along with a prompt 601 that invites the first player to press a control button on their game controller in order to accept the virtual world merge invitation received from the second player. In the example of FIG. 6, the ghosted version of the portion of the second instance of the virtual world is visually distinguished using dashed/dotted lines. The ghosted version of the features of the second instance of the virtual world as presented to the first player in the first video stream enables the first player to assess whether or not the virtual world merge is desirable by effectively showing what in-game features would be present in a merged instance of the virtual world created from the first and second instances of the virtual world of the first and second players, respectively.

Figure 7:
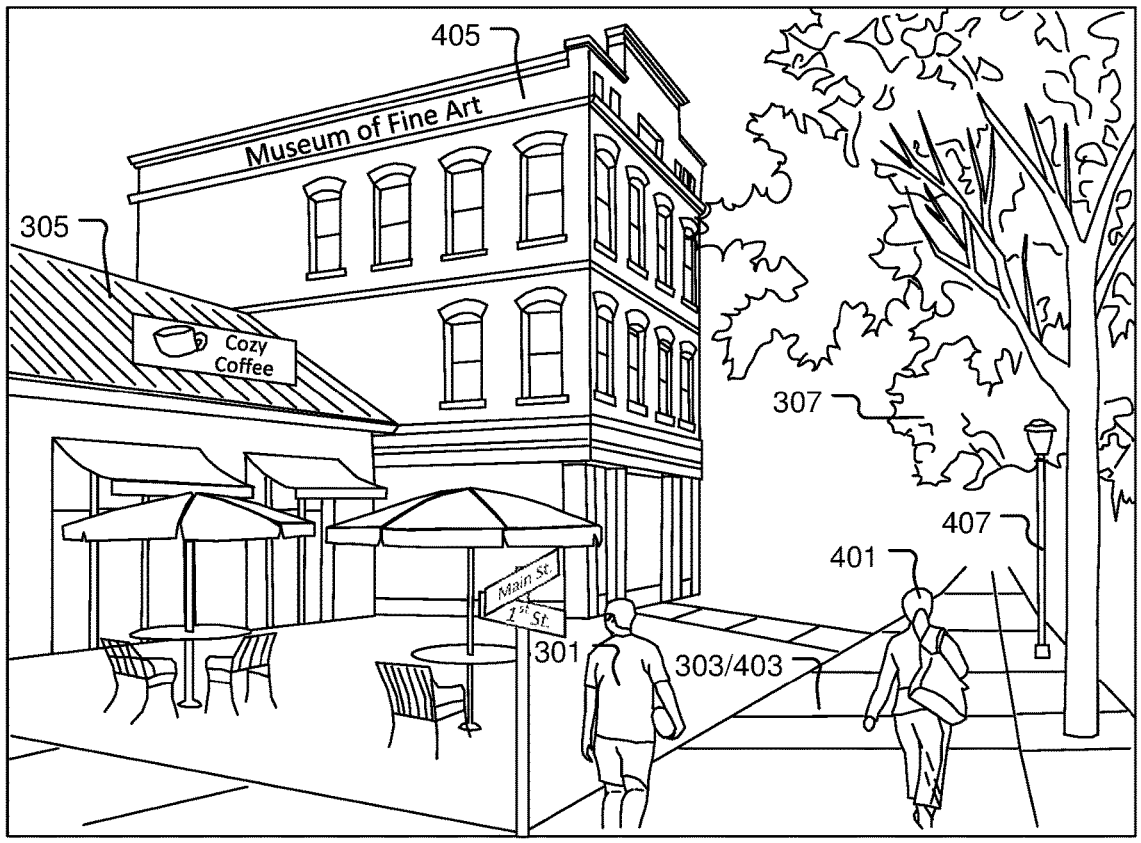
FIG. 7 shows an example image of the merged instance of the virtual world generated by combining the first instance of the virtual world of the first player (as shown in FIG. 3) and the second instance of the virtual world of the second player (as shown in FIG. 4), in accordance with some embodiments.

The method of FIG. 2 continues with an operation 211 for receiving an approval from the first player to merge the first instance of the virtual world of the first player and the second instance of the virtual world of the second player. In response to receiving the approval in operation 211, the method proceeds with an operation 213 for generating a merged instance of the virtual world that is a combination of the first instance of the virtual world of the first player and the second instance of the virtual world of the second player. In some embodiments, generating the merged instance of the virtual world includes incorporation of in-game objects from both the first instance of the virtual world of the first player and the second instance of the virtual world of the second player into the merged instance of the virtual world. For example, FIG. 7 shows an example image of the merged instance of the virtual world generated by combining the first instance of the virtual world of the first player (as shown in FIG. 3) and the second instance of the virtual world of the second player (as shown in FIG. 4), in accordance with some embodiments. The merged instance of the virtual world as shown in FIG. 7 includes in-game objects from both the first instance of the virtual world of the first player and the second instance of the virtual world of the second player. For example, the merged instance of the virtual world includes in-game objects such as the Museum of Fine Art 405, the coffee shop 305, the maple tree 307, the streetlamp 407, as well as the avatar 301 of the first player and the avatar 401 of the second player.

Figure 8A:
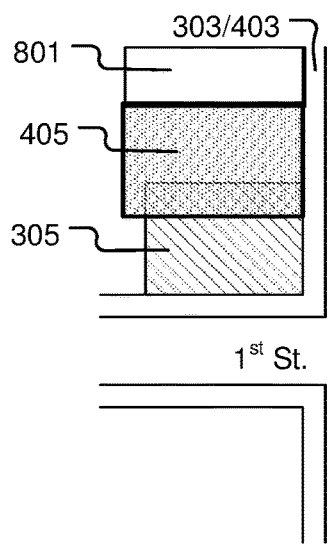
FIG. 8A shows an example overhead layout view of the portion of the virtual world near the corner of $1^{st}$ St. and Main St. from the examples of FIGS. 3 and 4 in which a positional interference exists between in-game objects in the first instance of the virtual world of the first player and the second instance of the virtual world of the second player, in accordance with some embodiments.
Figure 8B:
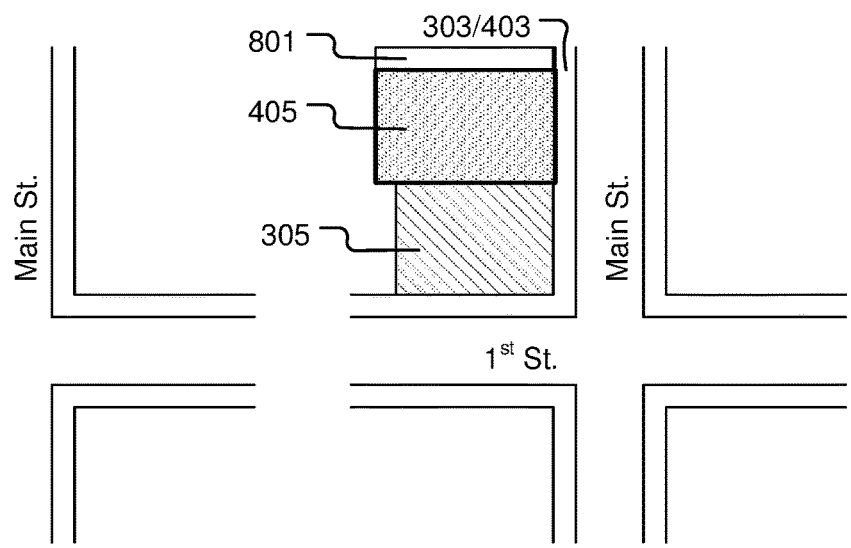
FIG. 8B shows an example overhead layout view of the merged instance of the virtual world at the corner of $1^{st}$ St. and Main St. in which the positional interference between the Museum of Fine Art and the coffee shop has been resolved by shifting the position of the Museum of Fine Art into the available open area, in accordance with some embodiments.

In some embodiments, generating the merged instance of the virtual world includes repositioning of one or more in-game objects in one or both of the first instance of the virtual world of the first player and the second instance of the virtual world of the second player to enable incorporation of each of the one or more in-game objects into the merged instance of the virtual world. For example, FIG. 8A shows an example overhead layout view of the portion of the virtual world near the corner of $1^{st}$ St. and Main St. from the examples of FIGS. 3 and 4 in which a positional interference exists between in-game objects in the first instance of the virtual of the first player and the second instance of the virtual world of the second player, in accordance with some embodiments. In the example of FIG. 8A, part of the coffee shop 305 in the first instance of the virtual world of the first player and part of the Museum of Fine Art 405 in the second instance of the virtual world of the second player occupy a same area within the virtual world, thereby creating a positional interference between in-game objects in generating the merged instance of the virtual world. In some embodiments, a positional interference between two or more in-game objects during generation of the merged instance of the virtual world is automatically handled by the cloud-based gaming system 100 to determine a best-fit solution for inclusion of the two or more in-game objects within the merged instance of the virtual world. For example, in FIG. 8A, the cloud-based gaming system 100 identifies an open area 801 next to the Museum of Fine Art 405 that can be used to resolve the positional interference between the Museum of Fine Art 405 and the coffee shop 305. FIG. 8B shows an example overhead layout view of the merged instance of the virtual world at the corner of $1^{st}$ St. and Main St. in which the positional interference between the Museum of Fine Art 405 and the coffee shop 305 has been resolved by shifting the position of the Museum of Fine Art 405 into the available open area 801, in accordance with some embodiments.

In some embodiments, it may not be possible to reposition in-game objects from the first instance of the virtual world of the first player and/or the second instance of the virtual world of the second player that have a substantial positional interference when generating the merged instance of the virtual world. In some embodiments, automatic generation of the merged instance of the virtual world by the cloud-based gaming system 100 includes identifying a first in-game object that occupies a particular space in the first instance of the virtual world of the first player and a second in-game object that occupies the same particular space in the second instance of the virtual world of the second player, and blending the first in-game object and the second in-game object to create a new blended in-game object that occupies the same particular space in the merged instance of the virtual world.

For example, FIG. 9A shows an example overhead layout view of the portion of the virtual world near the corner of $1^{st}$ St. and Main St. from the examples of FIGS. 3 and 4 in which a substantial positional interference exists between in-game objects in the first instance of the virtual world of the first player and the second instance of the virtual world of the second player, in accordance with some embodiments. In the example of FIG. 9A, the coffee shop 305 in the first instance of the virtual world of the first player and the Museum of Fine Art 405 in the second instance of the virtual world of the second player essentially occupy a same area within the virtual world, thereby creating a substantial positional interference between in-game objects in generating the merged instance of the virtual world. Also, in this example, another in-game object 901 occupies the area right next to the Museum of Fine Art 405. Therefore, it is not possible to reposition either the coffee shop 305 or the Museum of Fine Art 405 in order to resolve the substantial positional interference. To this end, in some embodiments, the cloud-based gaming system 100 automatically blends the coffee shop 305 and the Museum of Fine Art 405 to create a new blended in-game object 903 that occupies the same space in the merged instance of the virtual world. In some embodiments, the new blended in-game object 903 is a mixture of features of each of the first in-game object, e.g., the coffee shop 305, and the second in-game object, e.g., the Museum of Fine Art 405.

In some embodiments, each of the first in-game object from the first instance of the virtual world of the first player and the second in-game object from the second instance of the virtual world of the second player that have a substantial positional interference is a same type of in-game object. For example, both the first in-game object from the first instance of the virtual world of the first player and the second in-game object from the second instance of the virtual world of the second player are respective coffee shops. In these situations, in some embodiments, the cloud-based gaming system 100 automatically resolves the substantial positional interference by creating a new blended in-game object as a single instance of the same type of in-game object, e.g., coffee shop, having features selected from each of the first in-game object and the second in-game object, e.g., from the coffee shop in the first instance of the virtual world of the first player and from the coffee shop in the second instance of the virtual world of the second player.

In some embodiments, the first in-game object from the first instance of the virtual world of the first player and the second in-game object from the second instance of the virtual world of the second player that have a substantial positional interference are different types of in-game objects. For example, the first in-game object from the first instance of the virtual world of the first player is the coffee shop 305, and the second in-game object from the second instance of the virtual world of the second player is the Museum of Fine Art 405. In these situations, in some embodiments, the cloud-based gaming system 100 automatically resolves the substantial positional interference by creating a new blended in-game object as a new type of in-game object that represents a combination of the first type of in-game object and the second type of in-game object, where the new blended in-game object has features selected from each of the first in-game object and the second in-game object. For example, FIG. 9B shows the new blended in-game object 903 is a combination of the coffee shop 305 from the first instance of the virtual world of the first player and the Museum of Fine Art 405 from the second instance of the virtual world of the second player, where the new blended in-game object 903 has features selected from each of the coffee shop 305 and the Museum of Fine Art 405, in accordance with some embodiments. In some embodiments, positional interferences between in-game objects, or between essentially any other game feature, when generating the merged instance of the virtual world are handled automatically by the cloud-based computing system 100 so as to minimize game play friction associated with merging of the first and second instances of the virtual world of the first and second players, respectively.

The method of FIG. 2 then proceeds with an operation 215 for transmitting a third video stream of a portion of the merged instance of the virtual world to the computing system of the first player in lieu of transmitting the first video stream to the computing system of the first player. The method also proceeds with an operation 217 for transmitting a fourth video stream of a portion of the merged instance of the virtual world to the computing system of the second player in lieu of transmitting the second video stream to the computing system of the second player. It should be understood that because the viewpoint and gameplay of each of the first and second players within the merged instance of the virtual world is independent, the third video stream and the fourth video stream can display different content within the merged instance of the virtual world at a given time. However, within the merged instance of the virtual world, the first player has access to all in-game objects that were brought in from the second instance of the virtual world of the second player, and likewise, the second player has access to all in-game objects that were brought in from the first instance of the virtual world of the first player. Also, while the method of FIG. 2 is described in terms of a first player and a second player for ease and clarity of description, it should be understood that the principles of the method of FIG. 2 can be extended to any number of players. For example, ghosted versions of multiple instances of the virtual world for respective multiple players can be simultaneously displayed in the game video stream transmitted to a given player. Also, multiple invitations to merge respective virtual worlds can be simultaneously conveyed in the game video stream transmitted to a given player.

In some embodiments, the cloud-based gaming system 100 automatically tracks and records the in-game objects and assets that are brought into the merged instance of the virtual world from each player's separate pre-merge instance of the virtual world. Also, in some embodiments, the cloud-based gaming system 100 automatically tracks and records the in-game objects and assets that are created during the existence of the merged instance of the virtual world. Also, in some embodiments, upon unmerging of the merged instance of the virtual world to re-establish separate instances of the virtual world for each of the players associated with the merged instance of the virtual world, the cloud-based gaming system 100 automatically determines the disposition of in-game objects and assets from within the merged instance of the virtual world.

FIG. 10 shows an example table for tracking various in-game objects within the merged instance of the virtual world, in accordance with some embodiments. The table includes a record for each in-game object that includes an identifier of the in-game object (Object ID), a description of the in-game object, a pre-merge status of the in-game object for each player, an in-merge status of the in-game object for each player, and a post-merge retention status of the in-game object for each player. For example, the table shows a record for the coffee shop 305 in-game object of the first player that is assigned identifier 001. The table shows that prior to the virtual world merge, the coffee shop 305 existed in the first instance of virtual world of the first player (P1), but not in the second instance of the virtual world of the second player (P2). The table also shows that the coffee shop 305 was not created during the existence of the merged instance of the virtual world. The table also shows that upon unmerging of the merged instance of the virtual world, the coffee shop 305 is to be retained in the unmerged instance of the virtual world of the first player (P1), but not in the unmerged instance of the virtual world of the second player (P2).

Also by way of example, the table of FIG. 10 shows a record for the sidewalk 303/403 in-game object that is assigned identifier 003. The table shows that prior to the virtual world merge, the sidewalk 303 existed in the first instance of virtual world of the first player (P1), and the same sidewalk 403 existed in the second instance of the virtual world of the second player (P2). The table also shows that the sidewalk 303/403 was not created during the existence of the merged instance of the virtual world. The table also shows that upon unmerging of the merged instance of the virtual world, the sidewalk 303/403 is to be retained in both the unmerged instance of the virtual world of the first player (P1) and the unmerged instance of the virtual world of the second player (P2).

Also by way of example, the table of FIG. 10 shows a record for the Museum of Fine Art 405 of the second player that is assigned identifier 004. The table shows that prior to the virtual world merge, the Museum of Fine Art 405 existed in the second instance of virtual world of the second player (P2), but not in the first instance of the virtual world of the first player (P1). The table also shows that the Museum of Fine Art 405 was not created during the existence of the merged instance of the virtual world. The table also shows that upon unmerging of the merged instance of the virtual world, the Museum of Fine Art 405 is to be retained in the unmerged instance of the virtual world of the second player (P2), but not in the unmerged instance of the virtual world of the first player (P1).

Also by way of example, the table of FIG. 10 shows a record for a theater in-game object that is assigned identifier 006. The table shows that prior to the virtual world merge, the theater in-game object did not exist in either first instance of the virtual world of the first player (P1) or the second instance of virtual world of the second player (P2). The table also shows that the theater in-game object was created by both the first player (P1) and the second player (P2) during the existence of the merged instance of the virtual world. The table also shows that upon unmerging of the merged instance of the virtual world, the theater in-game object is to be retained in both the unmerged instance of the virtual world of the first player (P1) and the unmerged instance of the virtual world of the second player (P2).

Also by way of example, the table of FIG. 10 shows a record for a pet dog in-game object that is assigned identifier 007. The table shows that prior to the virtual world merge, the pet dog in-game object did not exist in either first instance of the virtual world of the first player (P1) or the second instance of virtual world of the second player (P2). The table also shows that the pet dog in-game object was created by the first player (P1) during the existence of the merged instance of the virtual world, but was not created by the second player (P2) during the existence of the merged instance of the virtual world. The table also shows that upon unmerging of the merged instance of the virtual world, the pet dog in-game object is to be retained in the unmerged instance of the virtual world of the first player (P1), but not in the unmerged instance of the virtual world of the second player (P2).

Also by way of example, the table of FIG. 10 shows a record for a garden in-game object that is assigned identifier 008. The table shows that prior to the virtual world merge, the garden in-game object did not exist in either first instance of the virtual world of the first player (P1) or the second instance of virtual world of the second player (P2). The table also shows that the garden in-game object was created by the second player (P2) during the existence of the merged instance of the virtual world, but was not created by the first player (P1) during the existence of the merged instance of the virtual world. The table also shows that upon unmerging of the merged instance of the virtual world, the garden in-game object is to be retained in the unmerged instance of the virtual world of the second player (P2), but not in the unmerged instance of the virtual world of the first player (P1).

It should be understood that the organization and schema of the table of FIG. 10 is provided by way of example. In various embodiments, the schema of the table of FIG. 10 can be modified as needed to facilitate tracking of in-game objects before and during the merger of different instances of the virtual world of different players. Also, in various embodiments, the cloud-based gaming system 100 can implement various rules for controlling the disposition of in-game objects/assets upon unmerging of the merged instanced of the virtual world. For example, in some embodiments, a player's retention of an in-game object/asset can be dependent upon the player's contribution to creation of the in-game object/asset. In some embodiments, a player's retention of an in-game object/asset can be dependent upon the player's modification and/or improvement of the in-game object/asset, without regard to the player's contribution to creation of the in-game object/asset. In some embodiments, a player's retention of an in-game object/asset can be dependent upon the player's abandonment or neglect of the in-game object/asset. It should be understood that essentially any rule or set of rules can be implemented by the cloud-based gaming system 100 to automatically determine an appropriate disposition of in-game objects/assets among different players upon unmerging of the merged instance of the virtual world.

Figure 11:
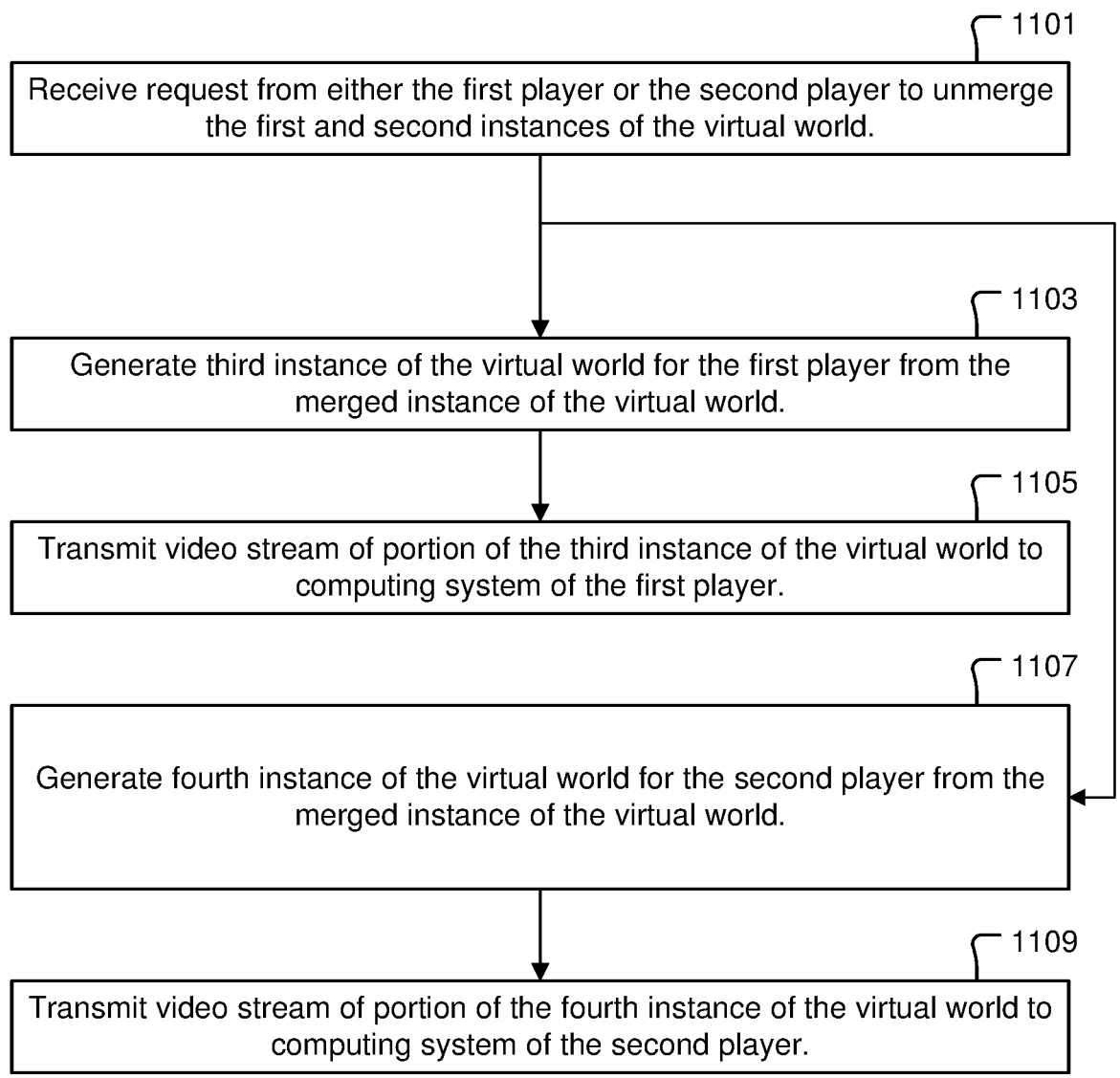
FIG. 11 shows a flowchart of a method for unmerging the merged instance of the virtual world, in accordance with some embodiments.

FIG. 11 shows a flowchart of a method for unmerging the merged instance of the virtual world, in accordance with some embodiments. The method of FIG. 11 is a continuation of the method of FIG. 2. The method includes an operation 1101 for receiving a request from either the first player or the second player to unmerge the merged instance of the virtual world. In some embodiments, a request to unmerge the merged instance of the virtual world from any player will trigger the unmerging. In some embodiments, each player within the merged instance of the virtual world has to approve of unmerging of the merged instance of the virtual world in order to trigger the unmerging. In some embodiments, a request to unmerge from the merged instance of the virtual world by a given player will trigger the unmerging of just that given player from the merged instance of the virtual world based on the current state of the merged instance of the virtual world, without effecting other players that remain within the merged instance of the virtual world. Upon receiving the request to unmerge in operation 1101, the method proceeds with an operation 1103 for generating a third instance of the virtual world for the first player from the merged instance of the virtual world. The term "third instance" of the virtual world of the first player is used to distinguish from the previously mentioned first instance of the virtual world of the first player and second instance of the virtual world of the second player. In some embodiments, generating the third instance of the virtual world for the first player includes adding to the first instance of the virtual world of the first player any in-game objects/assets created/obtained by the first player within the merged instance of the virtual world. In some embodiments, generating the third instance of the virtual world for the first player includes adding to the first instance of the virtual world of the first player any in-game objects/assets jointly created/obtained by both the first player and the second player within the merged instance of the virtual world. The method then proceeds with an operation 1105 for transmitting a fifth video stream of a portion of the third instance of the virtual world of the first player to the computing system of the first player.

The method also includes an operation 1107 for generating a fourth instance of the virtual world for the second player from the merged instance of the virtual world. The term "fourth instance" of the virtual world of the second player is used to distinguish from each of the previously mentioned first instance of the virtual world of the first player, second instance of the virtual world of the second player, and third instance of the virtual world of the first player. In some embodiments, generating the fourth instance of the virtual world for the second player includes adding to the second instance of the virtual world of the second player any in-game objects/assets created/obtained by the second player within the merged instance of the virtual world. In some embodiments, generating the fourth instance of the virtual world for the second player includes adding to the second instance of the virtual world of the second player any in-game objects/assets jointly created/obtained by both the first player and the second player within the merged instance of the virtual world. The method proceeds with an operation 1109 for transmitting a sixth video stream of a portion of the fourth instance of the virtual world of the second player to the computing system of the second player. It should be understood that in some embodiments, the operations 1103 through 1109 are performed in parallel by the cloud-based gaming system 100. Also, while the method of FIG. 11 is described in terms of the first player and the second player for ease and clarity of description, it should be understood that the principles of the method of FIG. 11 can be extended to any number of players.

Figure 12:
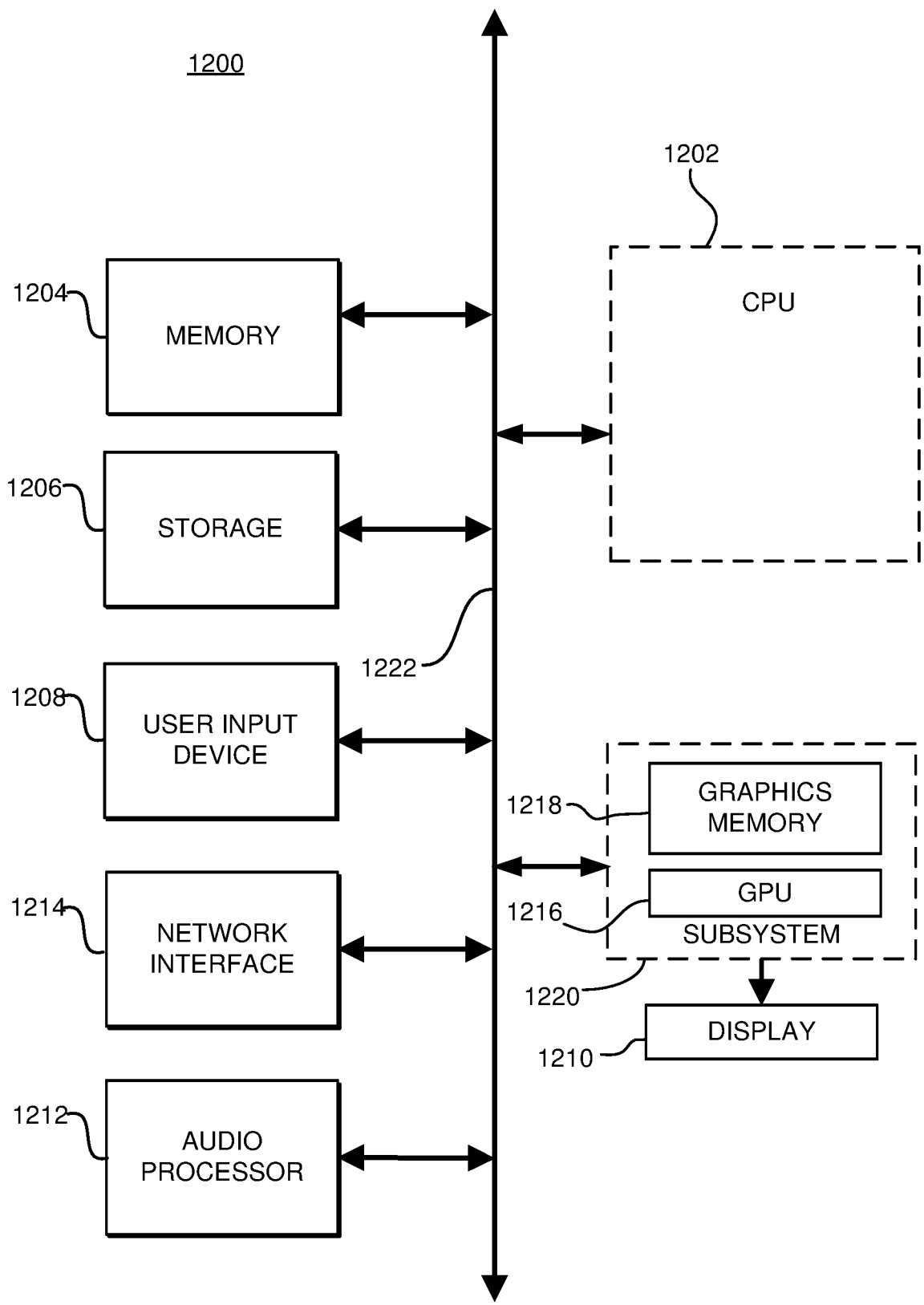
FIG. 12 illustrates components of an example server device within the cloud-based gaming system that can be used to perform aspects of the various embodiments of the present disclosure, in accordance with some embodiments.

FIG. 12 illustrates components of an example server device 1200 within the cloud-based gaming system 100 that can be used to perform aspects of the various embodiments of the present disclosure, in accordance with some embodiments. This block diagram illustrates the server device 1200 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 1200 includes a central processing unit (CPU) 1202 for running software applications and optionally an operating system. CPU 1202 may be comprised of one or more homogeneous or heterogeneous processing cores. For example, CPU 1202 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1200 may be localized to a player playing a game segment (e.g., game console), or remote from the player (e.g., back-end server processor), or one of many servers using virtualization in the cloud-based gaming system 100 for remote streaming of game play to client devices.

Memory 1204 stores applications and data for use by the CPU 1202. Storage 1206 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1208 communicate user inputs from one or more users to device 1200, examples of which may include keyboards, mice, joysticks, touch pads, touch screens, still or video recorders/cameras, tracking devices for recognizing gestures, and/or microphones. Network interface 1214 allows device 1200 to communicate with other computer systems via an electronic communications network, and may include wired or wireless communication over local area networks and wide area networks such as the internet. An audio processor 1212 is adapted to generate analog or digital audio output from instructions and/or data provided by the CPU 1202, memory 1204, and/or storage 1206. The components of device 1200, including CPU 1202, memory 1204, data storage 1206, user input devices 1208, network interface 1214, and audio processor 1212 are connected via one or more data buses 1222.

A graphics subsystem 1220 is further connected with data bus 1222 and the components of the device 1200. The graphics subsystem 1220 includes a graphics processing unit (GPU) 1216 and graphics memory 1218. Graphics memory 1218 includes a display memory (e.g., a frame buffer) used for storing pixel data for each pixel of an output image. Graphics memory 1218 can be integrated in the same device as GPU 1216, connected as a separate device with GPU 1216, and/or implemented within memory 1204. Pixel data can be provided to graphics memory 1218 directly from the CPU 1202. Alternatively, CPU 1202 provides the GPU 1216 with data and/or instructions defining the desired output images, from which the GPU 1216 generates the pixel data of one or more output images. The data and/or instructions defining the desired output images can be stored in memory 1204 and/or graphics memory 1218. In an embodiment, the GPU 1216 includes 3D rendering capabilities for generating pixel data for output images from instructions and data defining the geometry, lighting, shading, texturing, motion, and/or camera parameters for a scene. The GPU 1216 can further include one or more programmable execution units capable of executing shader programs.

The graphics subsystem 1220 periodically outputs pixel data for an image from graphics memory 1218 to be displayed on display device 1210. Display device 1210 can be any device capable of displaying visual information in response to a signal from the device 1200, including CRT, LCD, plasma, and OLED displays. In addition to display device 1210, the pixel data can be projected onto a projection surface. Device 1200 can provide the display device 1210 with an analog or digital signal, for example.

It should be noted, that access services, such as providing access to games of the current embodiments, delivered over a wide geographical area often use cloud-based computing. Cloud-based computing is a style of computing in which dynamically scalable and often virtualized resources are provided as a service over the Internet. Users do not need to be an expert in the technology infrastructure in the "cloud" that supports them. Cloud-based computing can be divided into different services, such as Infrastructure as a Service (IaaS), Platform as a Service (PaaS), Gaming as a Service (GaaS), and Software as a Service (SaaS). Cloud-based computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help function, etc. While game engines may sometimes be executed on an operating system virtualized by a hypervisor of a particular server, in other embodiments, the game engine itself is distributed among a plurality of processing entities, each of which may reside on different server units of a data center.

In some embodiments, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via the cloud-based gaming system 100, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud-based gaming system 100 via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the game server of the cloud-based gaming system 100, without being required to communicate such inputs through the client device first. For example, the controller might connect to a local networking device (such as the aforementioned router) to send to and receive data from the game server. Thus, while the client device may still be required to receive video output from the cloud-based video game and render it on a local display, input latency can be reduced by allowing the controller to send inputs directly over the network to the game server of the cloud-based gaming system 100, bypassing the client device.

In one embodiment, a networked controller and client device can be configured to send certain types of inputs directly from the controller to the game server of the cloud-based gaming system 100, and other types of inputs via the client device. For example, inputs whose detection does not depend on any additional hardware or processing apart from the controller itself can be sent directly from the controller to the game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the game server. These might include captured video or audio from the game environment that may be processed by the client device before sending to the game server. Additionally, inputs from motion detection hardware of the controller might be processed by the client device in conjunction with captured video to detect the position and motion of the controller, which would subsequently be communicated by the client device to the game server. It should be appreciated that the controller device in accordance with various embodiments may also receive data (e.g., feedback data) from the client device or directly from the game server.

In some embodiments, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD, the real-world objects, and inertial sensor data from the Inertial Motion Unit (IMU) sensors, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to the cloud-based gaming system 100 over the network 103. In some embodiments, the cloud-based gaming system 100 maintains and executes the video game being played by the user. In some embodiments, the cloud-based gaming system 100 is configured to receive inputs from the HMD and the interface objects over the network 103. The cloud-based gaming system 100 is configured to process the inputs to affect the game state of the executing video game. The output from the executing video game, such as video data, audio data, and haptic feedback data, is transmitted to the HMD and the interface objects. In other implementations, the HMD may communicate with the cloud-based gaming system 100 wirelessly through alternative mechanisms or channels such as a cellular network. Additionally, though implementations in the present disclosure may be described with reference to the HMD, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

As noted, implementations of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code (program instructions) on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

What is claimed is:

1. A method for managing a virtual world in cloud-based online gaming, comprising:
   generating a first instance of a virtual world for a first player;
   transmitting a first video stream of a portion of the first instance of the virtual world to a computing system of the first player;
   generating a second instance of the virtual world for a second player, wherein generation of the second instance of the virtual world for the second player is done independently from generation of the first instance of the virtual world for the first player;
   transmitting a second video stream of a portion of the second instance of the virtual world to a computing system of the second player, wherein the second video stream includes a ghosted version of at least one feature of the first instance of the virtual world;
   receiving a request from the second player to merge the first and second instances of the virtual world;
   receiving an approval from the first player to merge the first and second instances of the virtual world;
   generating a merged instance of the virtual world that is a combination of the first and second instances of the virtual world;
   transmitting a third video stream of a portion of the merged instance of the virtual world to the computing system of the first player in lieu of the first video stream; and
   transmitting a fourth video stream of a portion of the merged instance of the virtual world to the computing system of the second player in lieu of the second video stream.

2. The method as recited in claim 1, wherein the portion of the first instance of the virtual world and the portion of the second instance of the virtual world correspond to a same region within the virtual world.

3. The method as recited in claim 1, wherein the ghosted version of at least one feature of the first instance of the virtual world is dynamically displayed within the second video stream.

4. The method as recited in claim 1, wherein the ghosted version of at least one feature of the first instance of the virtual world includes a ghosted version of an avatar of the first player.

5. The method as recited in claim 1, wherein the ghosted version of at least one feature of the first instance of the virtual world includes a ghosted version of an in-game object within the first instance of the virtual world.

6. The method as recited in claim 1, wherein the request from the second player to merge the first and second instances of the virtual world is initiated by activation of a user-activatable control displayed in the second video stream.

7. The method as recited in claim 6, wherein the user-activatable control is displayed in conjunction with display of the ghosted version of at least one feature of the first instance of the virtual world.

8. The method as recited in claim 6, wherein the user-activatable control is activated by one or more of a controller input, a voice command, and a video-captured player gesture.

9. The method as recited in claim 1, wherein generating the merged instance of the virtual world includes incorporation of in-game objects from both the first instance of the virtual world and the second instance of the virtual world into the merged instance of the virtual world.

10. The method as recited in claim 1, wherein generating the merged instance of the virtual world includes repositioning of one or more in-game objects in one or both of the first instance of the virtual world and the second instance of the virtual world to enable incorporation of each of the one or more in-game objects into the merged instance of the virtual world.

11. The method as recited in claim 1, wherein generating the merged instance of the virtual world includes identifying a first in-game object that occupies a particular space in the first instance of the virtual world and a second in-game object that occupies the same particular space in the second instance of the virtual world, and blending the first in-game object and the second in-game object to create a new blended in-game object that occupies the same particular space in the merged instance of the virtual world.

12. The method as recited in claim 11, wherein the new blended in-game object is a mixture of features of each of the first in-game object and the second in-game object.

13. The method as recited in claim 11, wherein each of the first in-game object and the second in-game object is a same type of in-game object, and wherein the new blended in-game object is a single instance of the same type of in-game object having features selected from each of the first in-game object and the second in-game object.

14. The method as recited in claim 11, wherein the first in-game object is a first type of in-game object and the second in-game object is a second type of in-game object different than the first type of in-game object, and wherein the new blended in-game object is a new type of in-game object that represents a combination of the first type of in-game object and the second type of in-game object, the new blended in-game object having features selected from each of the first in-game object and the second in-game object.

15. The method as recited in claim 1, further comprising:
   receiving a request from either the first player or the second player to unmerge the merged instance of the virtual world;
   generating a third instance of the virtual world for the first player from the merged instance of the virtual world;

transmitting a fifth video stream of a portion of the third instance of the virtual world to the computing system of the first player;

generating a fourth instance of the virtual world for the second player from the merged instance of the virtual world; and transmitting a sixth video stream of a portion of the fourth instance of the virtual world to the computing system of the second player.

16. The method as recited in claim 15, wherein generating the third instance of the virtual world for the first player includes adding to the first instance of the virtual world any in-game objects created by the first player within the merged instance of the virtual world, and wherein generating the fourth instance of the virtual world for the second player includes adding to the second instance of the virtual world any in-game objects created by the second player within the merged instance of the virtual world.

17. The method as recited in claim 15, wherein generating the third instance of the virtual world for the first player includes adding to the first instance of the virtual world any in-game objects jointly created by both the first player and the second player within the merged instance of the virtual world, and wherein generating the fourth instance of the virtual world for the second player includes adding to the second instance of the virtual world any in-game objects jointly created by both the first player and the second player within the merged instance of the virtual world.

18. A cloud-based online gaming system, comprising:

a server computing system programmed to generate a first instance of a virtual world for a first player, the server computing system programmed to transmit a first video stream of a portion of the first instance of the virtual world to a computing system of the first player, the server computing system programmed to generate a second instance of the virtual world for a second player, wherein generation of the second instance of the virtual world for the second player is done independently from generation of the first instance of the virtual world for the first player, the server computing system programmed to transmit a second video stream of a portion of the second instance of the virtual world to a computing system of the second player, wherein the second video stream includes a ghosted version of at least one feature of the first instance of the virtual world, the server computing system programmed to receive a request from the second player to merge the first and second instances of the virtual world, the server computing system programmed to receive an approval from the first player to merge the first and second instances of the virtual world, the server computing system programmed to automatically generate a merged instance of the virtual world that is a combination of the first and second instances of the virtual world, the server computing system programmed to transmit a third video stream of a portion of the merged instance of the virtual world to the computing system of the first player in lieu of the first video stream, and the server computing system programmed to transmit a fourth video stream of a portion of the merged instance of the virtual world to the computing system of the second player in lieu of the second video stream.

19. The cloud-based online gaming system as recited in claim 18, wherein the server computing system is programmed to automatically include in-game objects from both the first instance of the virtual world and the second instance of the virtual world into the merged instance of the virtual world, wherein the server computing system is programmed to automatically resolve spatial conflicts in the merged instance of the virtual world between in-game objects included from each of the first instance of the virtual world and the second instance of the virtual world.

20. The cloud-based online gaming system as recited in claim 18, wherein the server computing system is programmed to receive a request from either the first player or the second player to unmerge the first and second instances of the virtual world, the server computing system programmed to generate a third instance of the virtual world for the first player from the merged instance of the virtual world, the server computing system programmed to transmit a fifth video stream of a portion of the third instance of the virtual world to the computing system of the first player, the server computing system programmed to generate a fourth instance of the virtual world for the second player from the merged instance of the virtual world, and the server computing system programmed to transmit a sixth video stream of a portion of the fourth instance of the virtual world to the computing system of the second player.

* * * * *